United States Patent
Pack et al.

(10) Patent No.: US 10,284,421 B2
(45) Date of Patent: May 7, 2019

(54) METHOD FOR ASSIGNING MASTER CONTROLLER IN SOFTWARE DEFINED NETWORK

(71) Applicant: KOREA UNIVERSITY RESEARCH AND BUSINESS FOUNDATION, Seoul (KR)

(72) Inventors: Sangheon Pack, Seoul (KR); Dongeun Suh, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 2 days.

(21) Appl. No.: 15/632,535

(22) Filed: Jun. 26, 2017

(65) Prior Publication Data

US 2017/0373929 A1     Dec. 28, 2017

(30) Foreign Application Priority Data

Jun. 24, 2016  (KR) .................. 10-2016-0079174

(51) Int. Cl.
    *H04L 12/24*        (2006.01)
(52) U.S. Cl.
    CPC .............. *H04L 41/08* (2013.01); *H04L 41/04* (2013.01); *H04L 41/142* (2013.01); *H04L 41/02* (2013.01); *H04L 41/042* (2013.01)
(58) Field of Classification Search
    CPC ....... H04L 41/08; H04L 41/142; H04L 41/04; H04L 41/042
    See application file for complete search history.

(56) References Cited

U.S. PATENT DOCUMENTS

| 2015/0188767 A1 | 7/2015 | Li et al. |
| 2015/0263960 A1* | 9/2015 | Kasturi .................. H04L 47/22 370/230.1 |
| 2016/0164787 A1* | 6/2016 | Roach .................. H04L 47/125 370/235 |

FOREIGN PATENT DOCUMENTS

| KR | 2014-0011559 A | 1/2014 |
| KR | 20150034551 A  | 4/2015 |
| KR | 20160003603 A  | 1/2016 |
| KR | 20160033039 A  | 3/2016 |

OTHER PUBLICATIONS

Suh et al., "Optimal Master Controller Assignment for Minimizing Flow Setup Latency in SDN", 2016 IEEE Conference on Computer Communications Workshops (INFOCOM WKSHPS): Student Activities, 2016, pp. 267-268.

* cited by examiner

*Primary Examiner* — Mohammad S Anwar
(74) *Attorney, Agent, or Firm* — Fox Rothschild LLP

(57) ABSTRACT

A method of assigning master controllers is disclosed. The method of assigning master controllers may be performed by any one of a plurality of controllers included in a software-defined network system and may include: establishing an objective function in which the number of flows passing through switches having different master controllers from among the flows entering during a unit duration of time is a decision variable; establishing at least one constraints; and finding a solution that minimizes the decision variable while satisfying the constraints.

7 Claims, 5 Drawing Sheets

METHOD FOR ASSIGNING MASTER CONTROLLER IN SOFTWARE DEFINED NETWORK

CROSS-REFERENCE TO RELATED APPLICATIONS

This application claims the benefit of Korean Patent Application No. 10-2016-0079174, filed with the Korean Intellectual Property Office on Jun. 24, 2016, the disclosure of which is incorporated herein by reference in its entirety.

BACKGROUND

Technical Field

The present disclosure relates to a method for assigning master controllers in a software-defined network, more particularly to a method for assigning a master controller for each switch within a software-defined network that includes multiple controllers.

Description of the Related Art

The software-defined network was proposed to provide a fundamental solution to the high cost and high level of complexity associated with establishing, maintaining, and operating a network in recent times. The software-defined network is structured such that the control part and the packet (or flow) transfer part of existing network equipment are separated.

In an SDN, the network control function and the data transfer function are separated from each other, and a logically centralized SDN controller controls the overall network. To ensure high availability, a switch may be accessed by many controllers, but only one of the controllers may have control authority over the switch. Here, the controller having control authority from among the many controllers connected to the switch is referred to as the master controller of said switch, whereas the other controllers that do not have control authority are referred to as slave controllers.

A switch may transmit a flow installation request message for a newly arrived flow (or packet), a network statistics message sent periodically or non-periodically to the controller, and other messages only to its master controller, and may process only the control messages transmitted from the master controller. The switch may not transmit messages to the slave controllers, other than messages for establishing connections. If the master controller of the switch experiences an error (software/hardware error or network error), one of the slave controllers is selected as the new master controller to control the corresponding equipment.

In such multiple SDN controller environment, if a flow passes through a path which includes switches that have been assigned different master controllers, the latency for installing the flow may be increased. Since this can be devastating to applications sensitive to latency, there is a need for a method of assigning master controllers that can reduce latency.

SUMMARY

The present document relates to a method for assigning master controllers that can minimize the average flow installation latency in consideration of the flow arrival rate between switches and the processing capacity of each controller.

In some scenarios, the method for assigning master controllers is to be performed by any one of a plurality of controllers included in a software-defined network system. The method may include: establishing an objective function in which the number of flows passing through switches having different master controllers from among the flows entering during a unit duration of time is a decision variable; establishing at least one constraints; and finding a solution that minimizes the decision variable while satisfying the constraints.

In those or other scenarios, a method for assigning master controllers determines the master controller for each of the switches in consideration of the average flow arrival rate between switches, thereby minimizing the average flow installation latency.

Also, a method for assigning master controllers can assign master controllers in consideration of the load applied on each of the controllers, to resolve any load imbalance between the controllers.

Additional aspects and advantages of the present solution will be set forth in part in the description which follows, and in part will be obvious from the description, or may be learned by practice of the present solution.

BRIEF DESCRIPTION OF THE DRAWINGS

A description of each of the drawings is provided below so that the drawings referenced in the detailed description may be readily understood.

FIG. 1A illustrates a flow installation process for a flow that passes through switches having the same master controller, and FIG. 1B illustrates a flow installation process for a flow that passes through switches having different master controllers.

DETAILED DESCRIPTION

Figure 1A:
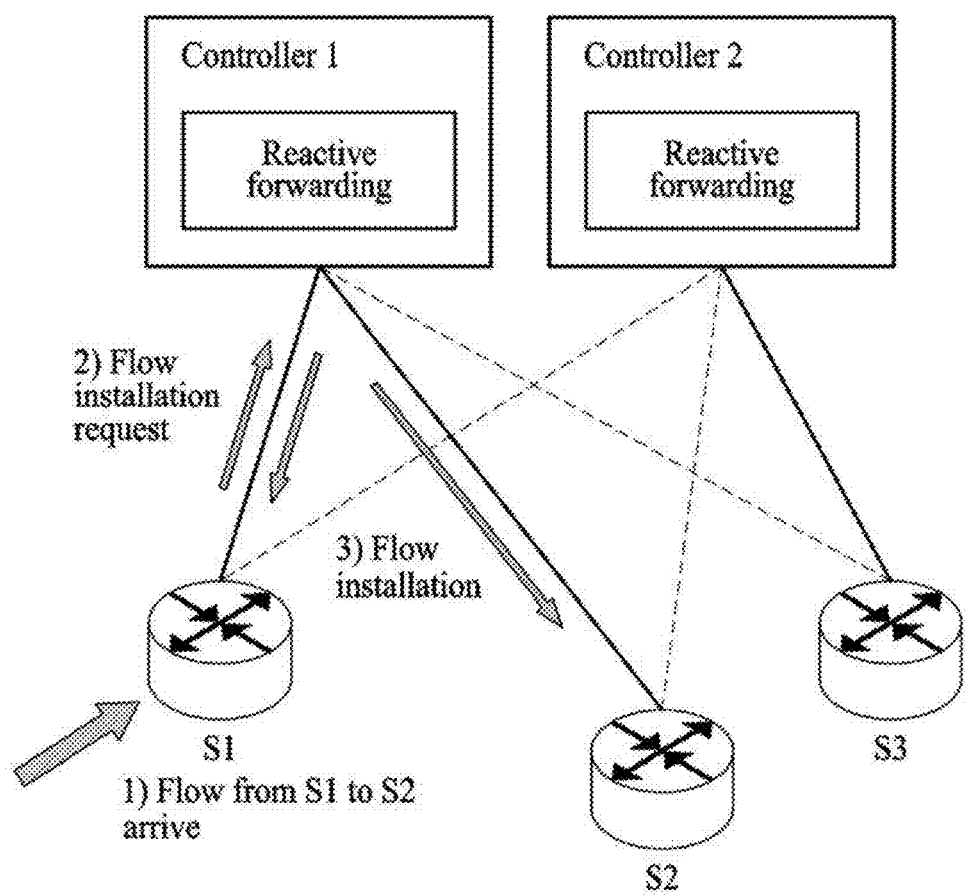
FIG. 1A and FIG. 1B illustrate flow installation processes based on reactive forwarding in a software-defined network, where

Descriptions of specific structures or functions relating to certain embodiments derived based on the concept of the present invention as set forth in the present specification are provided merely as examples for explaining the embodiments derived from the concept of the invention. The embodiments can be practiced in a variety of implementations and are not limited to the embodiments described herein.

As the embodiments derived from the concept of the present invention allow for various modifications and can be implemented in various forms, certain embodiments are illustrated in the drawings and described in detail in the present specification. However, this is not intended to limit the embodiments derived from the concept of the invention to the specific disclosed forms, and it is to be appreciated that all modifications, equivalents, and substitutes that do not depart from the spirit and technical scope of the present invention are encompassed in the present invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component.

When a component is mentioned to be "connected" or "joined" to another component, this may mean that it is directly connected or joined to the other element, but it is to be understood that yet another component may exist in-between. On the other hand, when a component is mentioned to be "directly connected" or "directly joined" to another component, it is to be understood that there are no other components in-between. The same applies to other expressions describing the relationships of components, such as "between" and "immediately between" or "neighboring" and "directly neighboring".

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms used herein, including technical or scientific terms, have the same meanings as those generally understood by those with ordinary knowledge in the field of art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

Figure 1B:
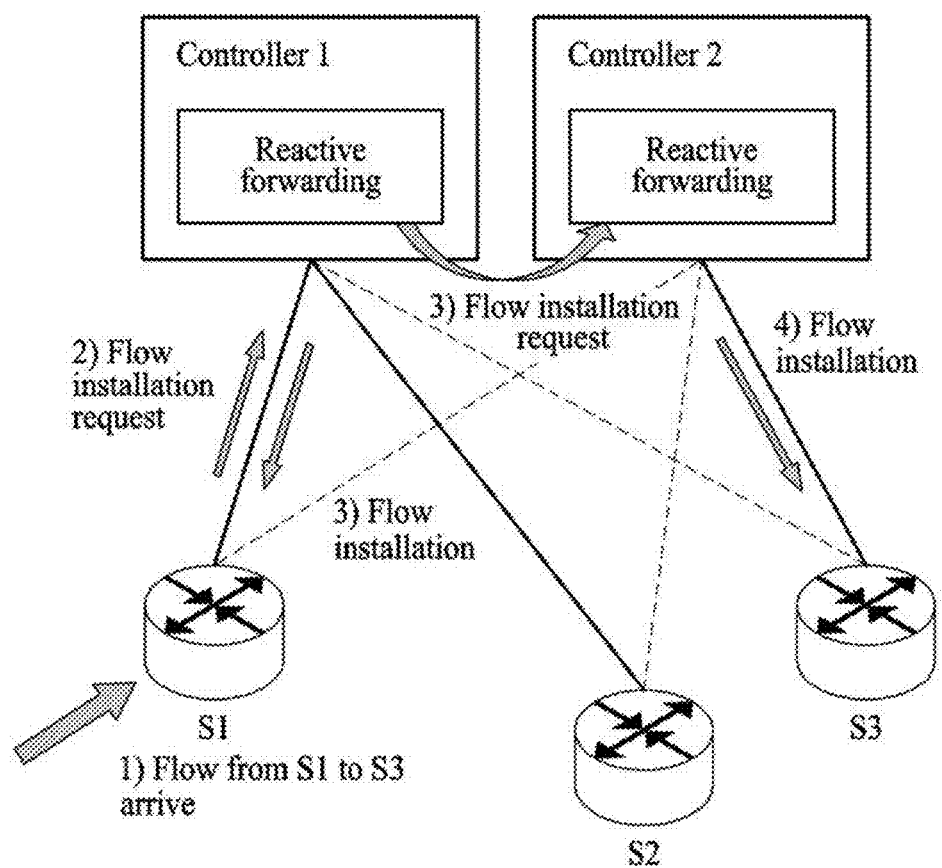

FIG. 1A and FIG. 1B illustrate flow installation processes based on reactive forwarding in a software-defined network (SDN).

The system, which can be named a SDN system, may provide a multiple SDN controller environment. In other words, the system can include a multiple number of controllers. Also, reactive forwarding refers to a forwarding scheme in which, when a new flow enters a switch, a controller reacts by installing a forwarding rule regarding the flow, i.e. a flow entry, on switches located along the path of the flow.

In FIGS. 1A and 1B, a solid line represents a connection between a switch and a master controller, while a dotted line represents a connection between a switch and a slave controller. The multiple controllers may maintain connections between one another and maintain a synchronized entire network view. All switches may have direct connections with one another and may each periodically transmit network statistics messages to its master controller. Here, a network statistics message can include various information, such as statistics information on flows installed in the flow table of the switch, statistics information on the ports of the switch, link status information, and the like. The length of the cycle for periodically transmitting the network statistics information can be arbitrarily set by the network administrator, and the average arrival rate of network statistics messages received by a controller from a switch can be calculated based on the set cycle.

Each of the multiple controllers may keep the number of occurrences $r_{ij}$ of flows moving from switch i to switch j during a unit duration of time, i.e. the average arrival rate, for all switch pairs (i,j). Since a switch provides the controller with information on newly arrived flows in the reactive forwarding scheme, the controller can calculate $r_{ij}$ based on the received information.

A "controller" mentioned herein refers to a functional entity that controls relevant components (e.g., switches, router, etc.) for controlling the movement of a flow (traffic or packet) and is not limited to a particular physical form or implementation position, etc. For instance, the controller can refer to a controller function entity as defined by the ONF (Open Networking Foundation), IETF (Internet Engineering Task Force), ETSI (European Telecommunications Standards Institute) and/or ITU-T (International Telecommunication Union-Telecommunication Standardization Sector).

Also, a "switch" mentioned herein refers to a functional element that actually provides forwarding, switching, or routing for a flow (traffic or packet) and can refer to a switch, router, switch element, router element, forwarding element, etc., defined by ONF, IETF, ETSI and/or ITU-T, etc.

FIG. 1A illustrates a flow installation process for a flow that passes through switches having the same master controller, i.e. from switch S1 to switch S2.

When the flow enters switch S1 from an arbitrary host, the flow table of switch S1 does not yet include a matching flow entry, and as such, switch S1 may transmit a flow installation request message to its master controller, Controller 1. In response to the flow installation request message, Controller 1 may transmit a flow entry generation command (or flow entry installation command) to switch S1 and switch S2, and switch S1 and switch S2 may in turn respond by installing a flow entry. Here, if it is supposed that the processing time at Controller 1 is negligible and the transmission latency from switches S1 and S2 to Controller 1 is the same as the transmission latency from Controller 1 to switches S1 and S2 at $d_{cs}$, then the flow installation latency $D_s$ for the flow that passes through switches S1 and S2 having the same master controller may be calculated as $2d_{cs}$.

FIG. 1B illustrates a flow installation process for a flow that passes through switches having different master controllers, i.e., from switch S1 to switch S3.

When the flow enters switch S1 from an arbitrary host, the flow table of switch S1 does not yet include a matching flow entry, and as such, switch S1 may transmit a flow installation request message to its master controller, Controller 1. In response to the flow installation request message, Controller 1 may transmit a flow entry generation command (or flow entry installation command) to switch S1, and switch S1 may in turn respond by installing a flow entry. At the same time as transmitting the flow entry generation command, Controller 1 may also transmit a second flow installation request message to Controller 2, which is the master controller for switch S3. On receiving the second flow installation request message, Controller 2 may transmit a second flow entry generation command to switch S3, and switch S3 may install a flow entry in response to the second flow entry generation command.

If it is supposed that the transmission latency between controllers, i.e. between Controller 1 and Controller 2, is the same at $d_{cc}$, then the flow installation latency $D_M$ for the flow that passes through switches S1 and S3 having different master controllers may be calculated as $2d_{cs}+d_{cc}$.

From FIG. 1A and FIG. 1B, it can be seen that the loads on the controllers and the average flow installation latency may vary depending on how the master controllers of the switches are decided. More specifically, it can be seen that, compared to the flow installation latency for a flow that passes through switches S1 and S2 having the same master controller, the flow installation latency for a flow that passes through switches S1 and S3 having different master controllers is greater by $d_{cc}$. Therefore, deciding the master controller for each of the switches may consider $r_{ij}$ to provide a low average flow installation latency and may calculate the load of each of the controllers to reduce load imbalance between controllers.

In some scenarios, the mathematical tool of integer nonlinear programming (INLP) may be employed for modeling the problem of assigning master controllers with the objectives of minimizing the average flow installation latency and limiting the load imbalance between controllers. Next, a specific objective function and a set of constraints may be defined. Here, the objective function can include the number (F) of flows that pass through switches having different master controllers, from among the flows entering during a unit duration of time, as the decision variable.

The set of controllers and the set of switches can be expressed as C={1, 2, . . . , N} and S={1, 2, . . . , K}. $x_i^c$ can be a binary variable representing whether or not a controller C is assigned as the master controller of a switch i. That is, if the controller C has been assigned as the master controller of the switch i, then the value of $x_i^c$ can be "1"; otherwise, the value of $x_i^c$ can be "0". If the average flow installation latency is l, then l can be expressed as Formula 1 shown below.

$$l = \frac{F \cdot D_M + \left(\sum_{i \in s}\sum_{j \in s} r_{ij} - F\right) \cdot D_S}{\sum_{i \in s}\sum_{j \in s} r_{ij}}$$ [Formula 1]

In Formula 1 above, F represents the number of flows that pass switches having different master controllers, from among the entering flows, during a unit duration of time. The present solution may carry the objective of minimizing the average flow installation latency l, which can be achieved by minimizing the value of F. Thus, the objective function may be defined as F and can be expressed as Formula 2 shown below.

$$F = \sum_{c \in C}\sum_{i \in s} x_i^c \sum_{j \in s}(1 - x_j^c)r_{ij}$$ [Formula 2]

Next, constraints for the INLP may be defined. First, the load $L_c$ applied on the controller c may be calculated as $L_c = \sum_{i \in S} x_i^c(m + \sum_{j \in S} r_{ij})$. Here, m represents the average arrival rate of network statistics messages received by the controller c from a switch. Here, the load $L_c$ on the controller c must be smaller than or equal to the processing capacity of $P_c$ of the controller c, defined as the amount of messages that can be processed during a unit duration of time. This can be expressed as Formula 3 shown below, and Formula 3 can be considered a first constraint.

$L_c \leq P_c$, for all $c \in C$ [Formula 3]

If it is supposed that L* is the ideal load for a controller, then L* may be calculated as $(\sum_{i \in S}\sum_{j \in S} r_{ij} + Km)/N$. To limit the load imbalance between controllers, the values of |L*−$L_c$| can be summed up for all controllers, and a normalized value of the sum can be set to be smaller than or equal to a predefined parameter T. This constraint may be expressed as Formula 4 shown below, where Formula 4 can be considered a second constraint.

$$\frac{\sum_{c \in C}|L^* - L_c|}{2(N-1)L^*} \leq T$$ [Formula 4]

Here, T may have the range of 0≤T≤1. If T=0, then the above constraint can only be satisfied when the loads of all of the controllers are perfectly balanced, i.e. when $L_c$=L*. On the other hand, if T=1, then the above constraint can be satisfied when the entire load is concentrated on one controller, i.e. when $L_c$=N·L* for an arbitrary controller c∈C.

Since only one master controller may be assigned for every switch, a third constraint can be set as follows. The third constraint may be expressed as Formula 5 shown below.

$$\sum_c x_i^c = 1, \text{ for all } i \in S$$ [Formula 5]

Also, since $x_i^c$ is a binary variable, the following fourth constraint may be applied, where the fourth constraint may be expressed as Formula 6 shown below.

$x_i^c \in \{0,1\}$, for all $i \in S$ and $c \in C$. [Formula 6]

Figure 2:
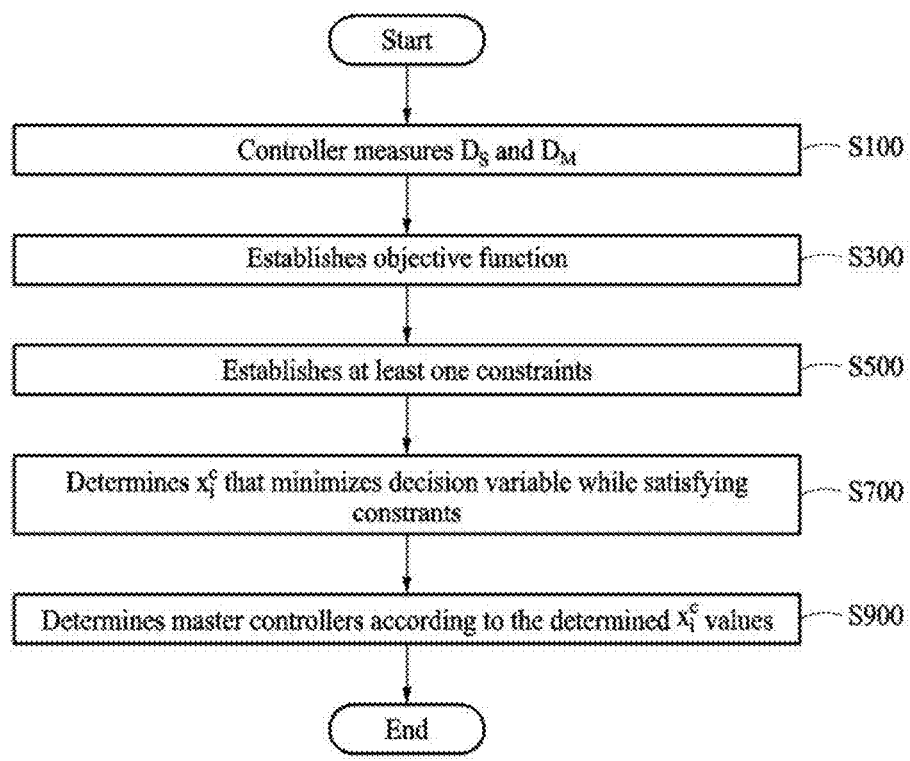
FIG. 2 is a flow diagram illustrating a method for assigning master controllers as performed by a controller.

FIG. 2 is a flow diagram illustrating a method for assigning master controllers as performed by a controller.

Referring to FIG. 1A through FIG. 2, the controller may first measure a first flow installation latency $D_S$ and a second flow installation latency $D_M$ (operation S100). The first flow installation latency $D_S$ can represent the flow installation latency for flows that pass through switches having the same master controller, while the second flow installation latency $D_M$ can represent the flow installation latency for flows that pass through switches having different master controllers. In certain scenarios, the first flow installation latency $D_S$ and second flow installation latency $D_M$ can be measured beforehand and stored in the controller.

Next, the controller may establish the objective function defined by Formula 2 above (operation S300). The average flow arrival rate $r_{ij}$ between switches included in Formula 2 can be stored beforehand in the controller.

Next, the controller can establish at least one constraints as defined by any one or more of Formula 3 through Formula 6 (operation S500). The at least one constraint can include one or more of the first constraint to the fourth constraint. Also, the first constraint may be defined by Formula 3, the second constraint may be defined by Formula 4, the third constraint may be defined by Formula 5, and the fourth constraint may be defined by Formula 6.

Next, the controller may determine $x_i^c$ values that minimize the decision variable of the objective function while satisfying the at least one constraints above (operation S700). The decision variable can represent the number of flows F that pass through switches having different master controllers, from among the flows that enter, during a unit duration of time.

Lastly, the controller can determine the master controllers of the switches, respectively, according to the determined $x_i^c$ values (operation S900). For example, if the value of $x_i^c$ is "1", then the controller c can be determined to be the master controller for the switch i, whereas if the value of $x_i^c$ is "0", then the controller c can be determined not to be the master controller for the switch i.

A method for assigning master controllers can be performed by one of or each of the controllers included in a SDN system. Since the multiple number of controllers each maintains a synchronized entire network view, the results performed by the controllers can all be the same.

In certain scenarios, the method for assigning master controllers can be performed by one controller included in the SDN system, with the results shared by multiple controllers.

Also, in certain scenarios, the method for assigning master controllers can be performed by an upper-level controller (or super controller) from among the controllers included in the SDN system. That is, the method can be performed by the upper-level controller of a SDN system having a hierarchical structure, with the results provided by the upper-level controller to each of the lower-level controllers.

Figure 3:
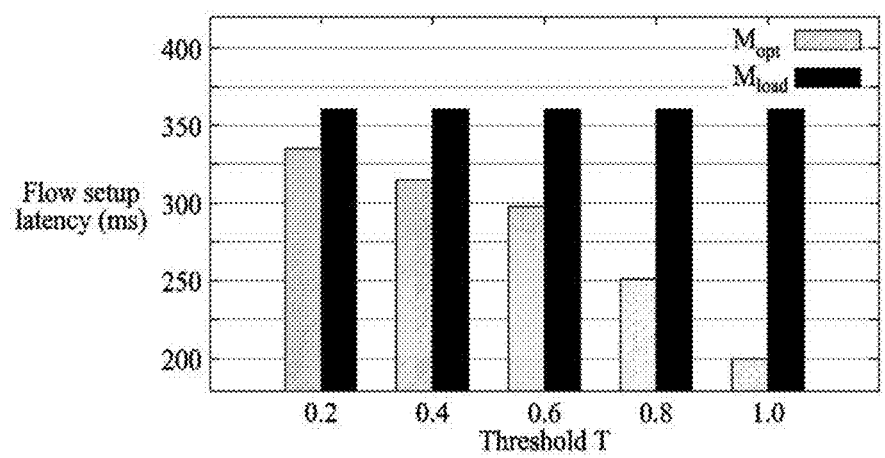
FIG. 3 is a graph illustrating changes in average flow installation latency according to a parameter.

FIG. 3 is a graph illustrating changes in average flow installation latency according to the parameter. In FIG. 3, $M_{opt}$ represents a case in which the master controllers were assigned using a method for assigning master controllers, while $M_{load}$ represents a case in which the master controllers were assigned such that the number of switches for which each controller operates as a master controller is the same.

Referring to FIG. 3, it can be seen that the average flow installation latency values of the $M_{opt}$ case are smaller than the average flow installation latency values of the $M_{load}$ case for all values of T. This is because the $M_{load}$ case does not consider flow installation latency. Also, from FIG. 3, it can be seen that the average flow installation latency decreases as the T value is increased. This is because increasing the T value relaxes the constraint on load imbalance between controllers. Thus, with the $M_{opt}$ case, increasing the T value results in increasingly lower average flow latency.

Figure 4:
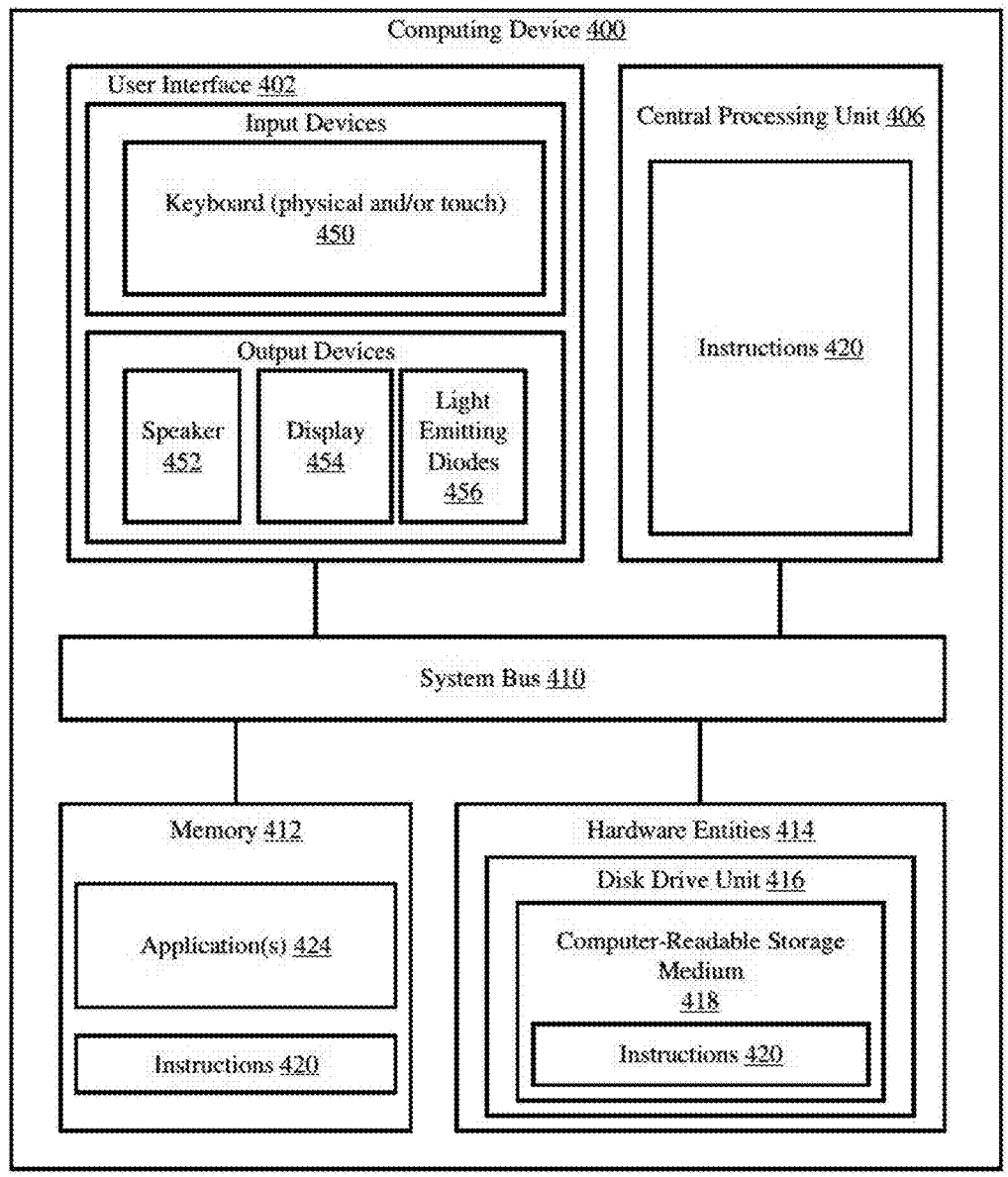
FIG. 4 is an illustration of an illustrative computing device.

Referring now to FIG. 4, there is provided an illustration of an exemplary architecture for a computing device 400. Controllers 1 and 2 of FIG. 1 are the same as or similar to computing device 400. As such, the discussion of computing device 400 is sufficient for understanding these components of the system described above in relation to FIGS. 1-3.

Computing device 400 may include more or less components than those shown in FIG. 4. However, the components shown are sufficient to disclose an illustrative solution implementing the present solution. The hardware architecture of FIG. 4 represents one implementation of a representative computing device configured to assign a master controller as described herein. As such, the computing device 400 of FIG. 4 implements at least a portion of the method(s) described herein.

Some or all the components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit ("CPU") 406, a system bus 410, a memory 412 connected to and accessible by other portions of computing device 400 through system bus 410, and hardware entities 414 connected to system bus 410. The user interface can include input devices and output devices, which facilitate user-software interactions for controlling operations of the computing device 400. The input devices include, but are not limited, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456.

At least some of the hardware entities 414 perform actions involving access to and use of memory 412, which can be a Random Access Memory ("RAM"), a disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

In some scenarios, the hardware entities 414 include an electronic circuit (e.g., a processor) programmed for assigning a master controller. In this regard, it should be understood that the electronic circuit can access and run application(s) 424 installed on the computing device 400. The functions of the software application(s) 424 are apparent from the above discussion of the present solution. For example, the software application is configured to perform one or more of the operations described above in relation to FIGS. 1-3.

While the spirit of the invention has been described in detail with reference to specific embodiments, the embodiments are for illustrative purposes only and do not limit the invention. It is to be appreciated that many variations and equivalent embodiments can be derived by those skilled in the art without departing from the scope and spirit of the invention. The true technical scope of the invention is to be defined by the technical spirit disclosed in the appended claims.

What is claimed is:

1. A method for controlling packet transmissions in a software-defined network system, the method comprising:
    establishing, by a computing device, an objective function having as a decision variable a number (F) of flows passing through switches having different master controllers from among flows entering during a unit duration of time;
    establishing at least one constraints;
    finding a solution satisfying the at least one constraints and minimizing the decision variable; and causing a slave controller of a plurality of controllers to be reconfigured as a master controller such that packet transmission operations of at least one of the switches are controlled in accordance with the solution;

wherein the objective function is defined by a first formula, the first formula being:

$$F = \sum_{c \in C} \sum_{i \in s} x_i^c \sum_{j \in s} (1 - x_j^c) r_{ij},$$

where said C refers to a set of the plurality of controllers, said S refers to a set of a plurality of switches, said $x_i^c$ is a binary variable representing whether or not a controller c included in the plurality of controllers is assigned as a master controller of a switch i included in the plurality of switches, and said $r_{ij}$ represents an average arrival rate for flows moving from said switch i to a switch j included in the plurality of switches.

2. The method according to 1, wherein the at least one constraints include a first constraint defined by a second formula, the second formula being:

$$L_c \leq P_c, \text{ for all } c \in C,$$

where said $L_c$ is a load on the controller c, and said $P_c$ is a processing capacity of the controller c.

3. The method according to claim 2, wherein the at least one constraints include a second constraint defined by a third formula, the third formula being:

$$\frac{\sum_{c \in C} |L^* - L_c|}{2(N-1)L^*} \leq T,$$

where said L* is an ideal load for one controller, said T is a predetermined constant, and said N is a number of the plurality of controllers.

4. The method according to claim 3, wherein the at least one constraints include a third constraint defined by a fourth formula, the fourth formula being:

$$\sum_c x_i^c = 1, \text{ for all } i \in S.$$

5. The method according to claim 4, wherein the at least one constraints include a fourth constraint defined by a fifth formula, the fifth formula being:

$$x_i^c \in \{0,1\}, \text{ for all } i \in S \text{ and } c \in C.$$

6. The method according to claim 5, wherein said $L_c$ is calculated using a sixth formula, the sixth formula being:

$$L_c = \sum_{i \in s} x_i^c \left( m + \sum_{j \in s} r_{ij} \right),$$

where said m represents an average arrival rate of network statistics messages received by said controller c from a switch.

7. The method according to claim 6, wherein said L* is calculated using a seventh formula, the seventh formula being:

$$L^* = \left( \sum_{i \in s} \sum_{j \in s} r_{ij} + Km \right) / N,$$

where said K is a number of the plurality of switches.

* * * * *